Patented Aug. 14, 1951

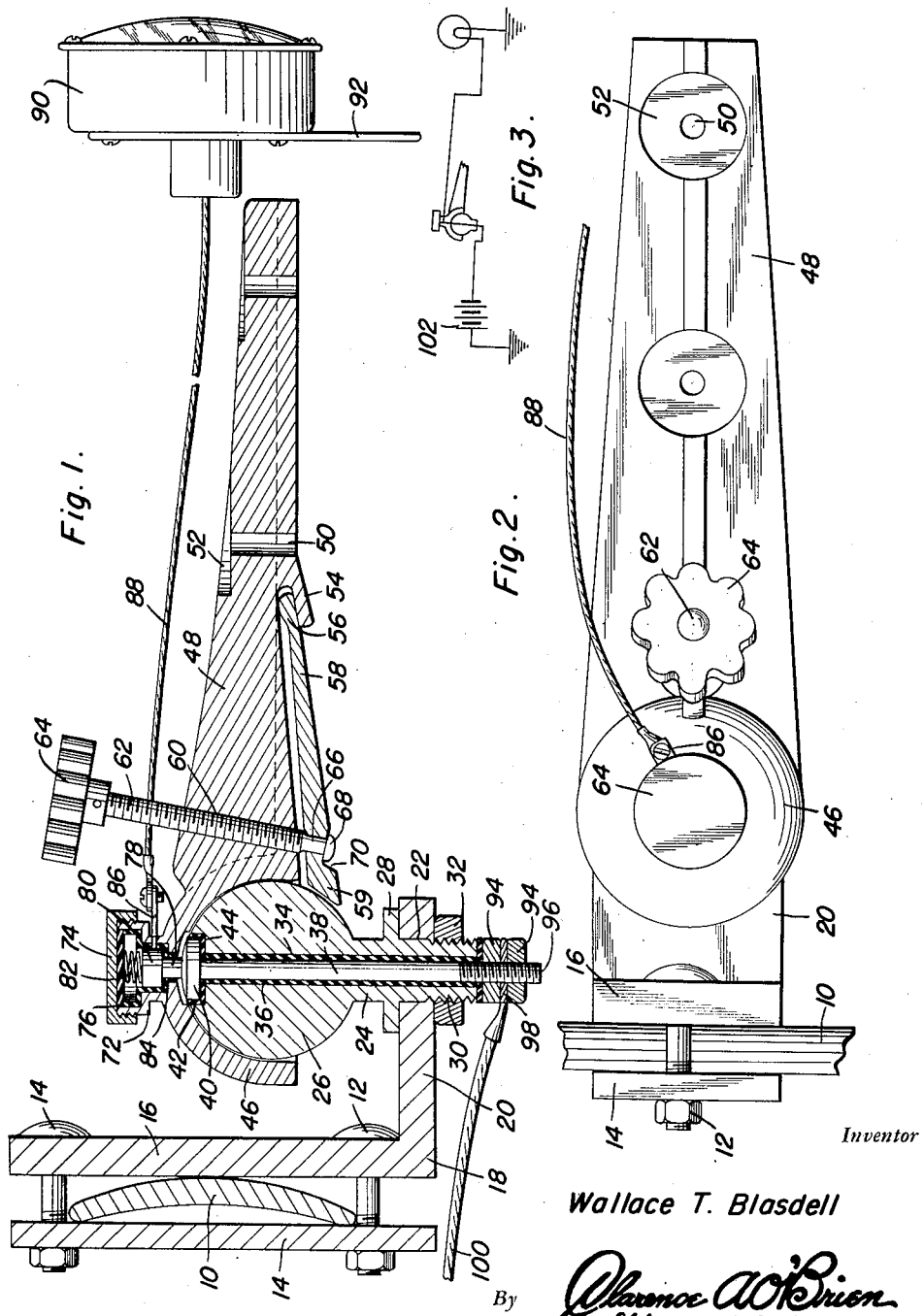

2,564,520

UNITED STATES PATENT OFFICE 2,564,520

ELECTRICAL COUPLING DEVICE

Wallace T. Blasdell, Reno, Nev., assignor of one-half to Donald J. MacDonald, Reno, Nev.

Application November 18, 1947, Serial No. 786,706

6 Claims. (Cl. 177—329)

This invention relates to new and useful improvements in couplings and the primary object of the present invention is to provide a coupling between a trailer and towing vehicle including novel and improved electrical signal means that will be energized at all times during the operative connection of the towing vehicle with the trailer.

Another important object of the present invention is to provide an electrical coupling device including a ball pin, a ball pin socket and novel and improved electrical contact means between the pin and socket for energizing a signal device such as a signal light that is mounted on a towed vehicle.

A further object of the present invention is to provide an electrical coupling for towing vehicles and towed vehicles so designed as to conveniently house the electrical contact parts of the device to protect the same from weathering.

A still further aim of the present invention is to provide an electrical coupling of the character referred to that is simple and practical in construction, strong and reliable in use, neat and compact in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal vertical sectional view of the present invention applied to a part of a towing vehicle, and with parts broken away and shown in section;

Figure 2 is a top plan view of Figure 1 and with the signal device removed therefrom; and Figure 3 is a diagrammatic view showing the manner in which the present coupling device is connected to a source of current.

Referring now to the drawings in detail, wherein for the purpose of illustration, there is disclosed a preferred embodiment of the present invention, the numeral 10 represents the rear bumper of a towing vehicle to which is removably secured by removable fasteners 12 an inner plate 14 and the opposing vertical leg 16 of an outer angular plate 18. The outer free leg 20 of plate 18 is provided with an aperture 22 that engages the shank portion 24 of a spherical member or ball pin 26. An annular bearing shoulder 28 integrally formed about the shank portion 24 bears upon the upper face of the leg 20 to prevent disengagement of the shank portion with the leg 20 and to space the ball pin 26 relative to leg 20. The lower extremity 30 of shank 24 projects well below the lower face of leg 20 and is externally threaded to receivably engage a jam nut 32 that will prevent rotation of the ball member relative to the leg 20.

An axial bore 34 is provided in the ball pin 26 and shank 24 and frictionally engages an insulating sleeve 36 that removably engages the shank portion of a fastener 38 having a head 40 that is seated in a cup shaped integral projection 42 of sleeve 36 which is positioned in an annular recess 44 provided in the upper periphery of the ball pin 26.

The numeral 46 represents a socket member or ball pin engaging member that is integrally formed at one end of a shank or trailer hitch 48. This shank 48 is provided with vertical bores 50 having annular fastener head engaging recesses 52 for receiving suitable fasteners such as nuts and bolts (not shown) for removably attaching the shank 48 to a trailer or towed vehicle (not shown).

An outwardly projecting retaining lip 54 extends downwardly from the lower portion of shank 48 and frictionally engages the rear edge 56 of a locking latch or plate 58. The forward arcuate edge 59 of the plate 58 is beveled to conform to the surface of the ball pin 26. An internally threaded bore 60 provided in the shank 48 receivably engages a screw threaded rod 62 having a finger gripping knob 64 at its upper end. The lower end of the rod 62 is provided with a swivel 66 that extends through the plate 58 with the flattened end 68 of the swivel engaging a recess 70 in the lower face of the plate 58.

Projecting outwardly from the upper periphery of the socket 46 is an integral housing 72 having a removable closure cap 74. The inner periphery of the housing 72 receives an insulating insert 76 in which is mounted an upper contact member 78 having an enlarged head 80 that is urged downwardly by a coil spring 82. An annular stop shoulder 84 is provided in the socket 46 and limits the downward movement of the head 80. It should be noted, that the contact member 78 is normally in contact with the head 40 of fastener 38 during pivotal movement of the socket relative to the ball pin.

Projecting outwardly from the housing 72 is a contact arm 86 that engages the head of contact member 78. This arm 86 is connected to a circuit wire 88 leading from a signal lamp 90 that is removably secured and grounded to a trailer or towed vehicle by a bracket 92.

In practical use of the device, a pair of insulated nuts 94 are receivably engaged on the threaded end 96 of fastener 38 and the eye contact tip 98 at one end of a circuit wire 100 leading from the battery 102 of the towing vehicle is disposed between the nuts 94. Such a structure as described, will afford means whereby the lamp will be energized at all times at the rear of the trailer, which is usually a code requirement, when the socket is operatively connected to the ball pin.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a coupling for trailers of motor vehicles, comprising in combination a ball pin, means removably securing said ball pin on one vehicle, a ball pin engaging member removably carried by the other vehicle, said ball pin being pivotally mounted in said engaging member, means for retaining said ball pin in pivotal relation to said engaging member, an electric signal device, a fixed contact member carried by said ball pin, a circuit connecting said contact member to a source of current, a further contact member carried by said engaging member normally contacting said first named contact member during pivotal movement of said engaging member relative to said ball pin, and a circuit connecting said further contact member to said signal device.

2. In a coupling for trailers of motor vehicles, comprising in combination a ball pin, means removably securing said ball pin on one vehicle, a ball pin engaging member removably carried by the other vehicle, said ball pin being pivotally mounted in said engaging member, means for retaining said ball pin in pivotal relation to said engaging member, an electric signal device, a fixed contact member carried by said ball pin, a housing including a removable closure carried by said engaging member, a spring urged contact member mounted within said housing contacting said first contact member during the coupled engagement of said ball pin with said engaging member, a circuit connecting said first named contact member to a source of current, an electrical signal device, and a further circuit connecting said spring urged contact member to said signal device.

3. The combination of claim 2 wherein said contact member extends vertically through said ball pin and includes a head portion recessed in said ball pin for engaging said spring urged contact member.

4. The combination of claim 2 wherein said signal device includes a visual indicator mounted on a trailer and constituting a safety signal for approaching motorists.

5. In a coupling for trailers of motor vehicles, comprising in combination a ball pin, means removably securing said ball pin on one vehicle, a ball pin engaging member removably carried by the other vehicle, said ball pin being pivotally mounted in said engaging member, means for retaining said ball pin in pivotal relation to said engaging member, an electric signal device, and means operatively connecting said signal device to said ball pin and said engaging member, said signal device being energized during the coupled engagement of said ball pin with said engaging member, said means operatively connecting said signal device to said ball pin and said engaging member including a conductive shank having a head portion, said ball pin having an axial bore receiving said shank, a recess provided in said ball pin receiving the head portion of said shank, a housing carried by said ball pin engaging member, and an upper contact member mounted in said housing and normally urged into engagement with the head portion of said shank.

6. In combination with a coupling for trailers of motor vehicles, comprising in combination a spherical member having a bore therethrough, a socket member swiveled on said spherical member, means retaining said socket member relative to said spherical member, an electrically operated signal, a circuit connecting said signal to a source of electric current, a first contact member received in the bore in said spherical member and having a head portion, a housing carried by said socket member, a spring urged contact member associated with said housing and having a bearing portion, the head portion of said first contact member including a convexed surface engaged with the bearing portion of said spring urged contact member, said contact members forming a switch controlling said circuit.

WALLACE T. BLASDELL.

REFERENCES CITED

The following references are of record in the file of this patent:

UNITED STATES PATENTS

| Number | Name | Date |
| --- | --- | --- |
| 2,158,175 | Coppola et al. | May 16, 1939 |
| 2,312,300 | Baerwald | Feb. 23, 1943 |
| 2,387,625 | Walther et al. | Oct. 23, 1945 |